US011683352B2

(12) United States Patent
Zhao et al.

(10) Patent No.: US 11,683,352 B2
(45) Date of Patent: Jun. 20, 2023

(54) METHOD AND APPARATUS OF ENHANCING MEDIA SESSION MANAGEMENT

(71) Applicant: Tencent America LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: Tencent America LLC, Palo Alto, CA (US)

(\*) Notice: Subject to any disclaimer, the term of this patent is extended or adjusted under 35 U.S.C. 154(b) by 0 days.

(21) Appl. No.: 17/746,914

(22) Filed: May 17, 2022

(65) Prior Publication Data

US 2022/0377115 A1 Nov. 24, 2022

Related U.S. Application Data

(60) Provisional application No. 63/190,730, filed on May 19, 2021.

(51) Int. Cl.
*H04L 65/1069* (2022.01)
*H04L 65/1104* (2022.01)

(52) U.S. Cl.
CPC ...... *H04L 65/1069* (2013.01); *H04L 65/1104* (2022.05)

(58) Field of Classification Search
CPC .............. H04L 65/1069; H04L 65/1104
USPC ........................................ 709/219
See application file for complete search history.

(56) References Cited

FOREIGN PATENT DOCUMENTS

WO WO-2021210942 A1 * 10/2021
WO WO-2022214193 A1 * 10/2022

\* cited by examiner

*Primary Examiner* — Glenford J Madamba
(74) *Attorney, Agent, or Firm* — ArentFox Schiff LLP

(57) ABSTRACT

In a method of session initiation protocol (SIP) session management, a SIP session information request is sent to a network resource management (NRM) server by a vertical application layer (VAL) server to obtain a list of SIP sessions established between (i) a VAL client associated with the VAL server and (ii) the NRM server. A response message comprising SIP session information is received by the VAL server from the NRM server in response to the SIP session information request. The SIP session information includes the list of SIP sessions established between the VAL client and the NRM server. A plurality of SIP sessions is managed across a plurality of NRM servers based on the response message, where the plurality of NRM servers comprises the NRM server and the plurality of SIP sessions comprises the list of SIP sessions established between the VAL client and the NRM server.

20 Claims, 5 Drawing Sheets

METHOD AND APPARATUS OF ENHANCING MEDIA SESSION MANAGEMENT

INCORPORATION BY REFERENCE

This present disclosure claims the benefit of priority to U.S. Provisional Application No. 63/190,730, "METHOD AND APPARATUS OF ENHANCING MEDIA SESSION MANAGEMENT" filed on May 19, 2021, which is incorporated by reference herein in its entirety.

TECHNICAL FIELD

The present disclosure relates to media session management.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An unmanned aerial vehicle (UAV), or uncrewed aerial vehicle, can include an aircraft without any human pilot, crew, or passengers on board. UAVs are a component of an unmanned aircraft system (UAS). The UAS can further include a ground-based controller and a system of communications with the UAV. A communication system to support the connectivity needs of unmanned aircraft systems is under development.

SUMMARY

Aspects of the disclosure provide methods and apparatuses for session initiation protocol (SIP) session management, such as in a service enabler architecture layer (SEAL) architecture. In some examples, an apparatus for SIP session management includes receiving circuitry and processing circuitry.

According to an aspect of the disclosure, a method of session initiation protocol (SIP) session management in a service enabler architecture layer (SEAL) architecture is provided. In the method, a SIP session information request can be sent to a network resource management (NRM) server by a vertical application layer (VAL) server to obtain a list of SIP sessions established between (i) a VAL client associated with the VAL server and (ii) the NRM server. A response message comprising SIP session information can be received by the VAL server from the NRM server in response to the SIP session information request. The SIP session information can include the list of SIP sessions established between the VAL client and the NRM server. A plurality of SIP sessions can be managed across a plurality of NRM servers based on the response message, where the plurality of NRM servers comprises the NRM server and the plurality of SIP sessions comprises the list of SIP sessions established between the VAL client and the NRM server.

In an embodiment, the SIP session information request can further include one of an identity (ID) of the VAL client and an ID of the VAL server.

In another embodiment, the SIP session information request can include an ID of a VAL group, where the VAL group can correspond to the VAL client and a VAL controller.

In some embodiments, the VAL server can include an unmanned aerial system application enabler (UAE) server, the VAL client can include an unmanned aerial vehicle (UAV), and the VAL controller can include a UAV controller.

In the method, the response message can indicate session IDs and session statuses associated with the SIP sessions in the list of SIP sessions, where each of the SIP sessions can be associated with a respective session ID and a respective session status.

In some embodiments, to manage the plurality of SIP sessions across the plurality of NRM servers, SIP session traffic of the plurality of SIP sessions can be redirected by the VAL server based on the response message.

In some embodiments, to manage the plurality of SIP sessions across the plurality of NRM servers, SIP connection requests can be balanced by the VAL server based on the response message.

In some embodiments, the SIP sessions in the list of SIP sessions can be initiated by a NRM client with the NRM server before the SIP session information request is sent by the UAE server.

According to another aspect of the disclosure, an apparatus is provided. The apparatus has processing circuitry. The processing circuitry can be configured to perform any of the methods mentioned above.

Aspects of the disclosure also provide a non-transitory computer-readable medium storing instructions which when executed by a computer cause the computer to perform any of the methods mentioned above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
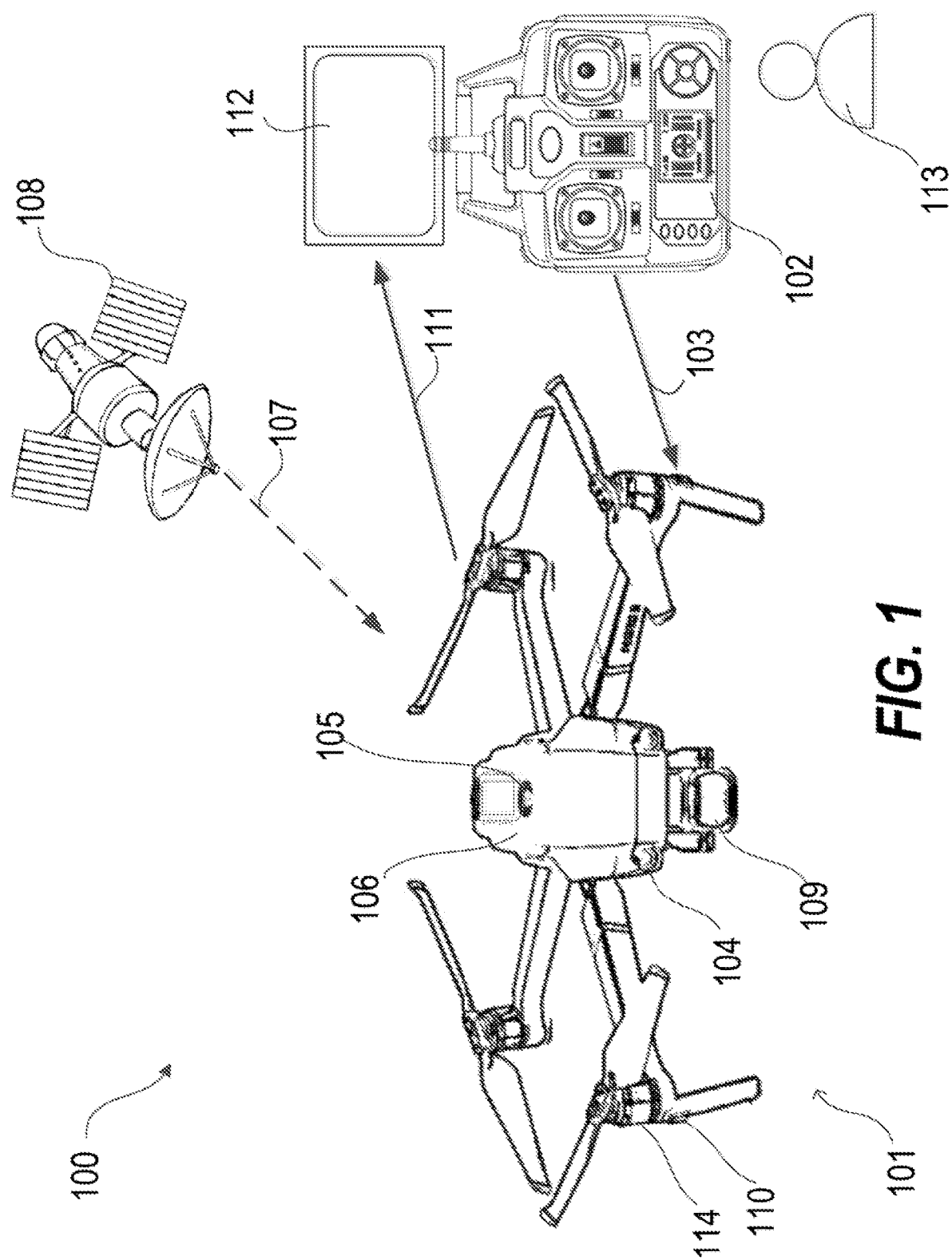
FIG. 1 is a schematic illustration of an Unmanned Aerial System (100) in accordance with an embodiment.

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication, through the data link (103), via very high frequency (VHF) and/or ultra-high frequency (UHF), and/or other wireless technology capable of analog and/or digital radio communications. The controller (102)

may control power levels of the propulsion unit (114), such as one or more motors and/or engines, of the UAV (101) and/or the control surfaces of a model aircraft (not depicted). More abstract commands like pitch, yaw, and roll, similar to those of helicopters and/or aircrafts can also be used. An experienced pilot can operate the UAV (101) with basic controls, not relying on advanced onboard processing of control signals inside the UAV (101). The UAV (101) can be in a form of a helicopter and/or any other aircraft.

Advances in onboard electronic designs allow the offloading of certain tasks from the human operator (or user) 113 to the UAV (101) itself. Many UAVs, such as the UAV (101), can include sensor(s) (104) that are coupled to an onboard control circuitry (105) for sensing the attitude as well as the acceleration of the UAV (101). The onboard control circuitry (105) can be a computer system with a scaled-down and/or non-existent user interface. The information obtained by the sensor(s) (104), in addition to the control inputs received from the data link (103) from the controller (102), allows the UAV (10) to remain stable unless a positive control input is obtained from the controller (102).

The UAV (101) can include a receiver (106) for one of the Global Navigation Satellite Systems (GNSS), such as the Global Positioning System (GPS) operated by the United States. FIG. 1 illustrates a single satellite (108) that can provide a communication signal (107), to represent a GNSS. However, the receiver (106) of the UAV (101) may receive communication from a GNSS that includes three or more, and typically four or more, line-of-sight satellites to triangulate the position of the UAV (101) in space. A GNSS receiver, such as the receiver (106), can determine with fair accuracy the position of the UAV (101) in space and time. In the UAV (101), the GNSS can be augmented by additional sensors (e.g., an ultrasonic and/or lidar sensor) of the UAV (101) on the, in many cases, most critical vertical (e.g., Z) axis to enable soft landings (not depicted). The UAV (101) including GNSS capability can offer the user "fly home" and "auto-land" features. Thus, the UAV (101), upon a simple command from the controller (102) (e.g., the push of a single button), or in case of a lost data link (103) from the controller or other timeout of meaningful control input, can fly to a location that was defined as a home location.

The UAV (101) can also include one or more cameras (109). In some cases, the UAV (101) can include a gimbal-mounted camera as one of the cameras (109). The gimbal-mounted camera can be used to record pictures and/or a video of a quality sufficient for the user (113) of the UAV (101), such as in high definition television resolution. The UAV (101) can include other cameras (110) for covering some or all axis of movement. Onboard signal processing based on signals of the other cameras (110) can be used to prevent the UAV (101) from colliding with both fixed and moving objects.

In some cases, the UAV (101) can include a "main" camera as one of the cameras (109). The signal of the "main" camera can be communicated via the data link (111) in real-time towards the human user (e.g., the user (113))., and displayed on a display device (112) included in, attached to, and/or separate from the controller (102). The data link (111) may be the same or different from the data link (103). Accordingly, the UAV (101) may be successfully flown out of line of sight of a human pilot, using a technique known as "First Person View" (FPV).

As a result of the technical developments, UAVs, such as the UAV (101), have become considerably easier to fly, which in turn has made them popular not only with professional UAV pilots and determined and affluent hobbyists, but also the general public. As a result, millions of UAV are now sold every year compared to a few thousand-if that many-model helicopters that were sold about 15 years ago. At the same time, the knowledge, proficiency, and engagement of the user community, on average, has decreased.

A service enabler architecture layer (SEAL) can support vertical applications (e.g., a UAV and vehicle to everything (V2X)). The SEAL functional entities on a user equipment (UE) and a server can be grouped into SEAL client(s) and SEAL server(s) respectively. The SEAL can include a common set of services (e.g., group management, location management) and reference points. The SEAL can offer its services to a vertical application layer (VAL). The VAL can include a VAL client (e.g., UAV) and a VAL server.

Figure 2:
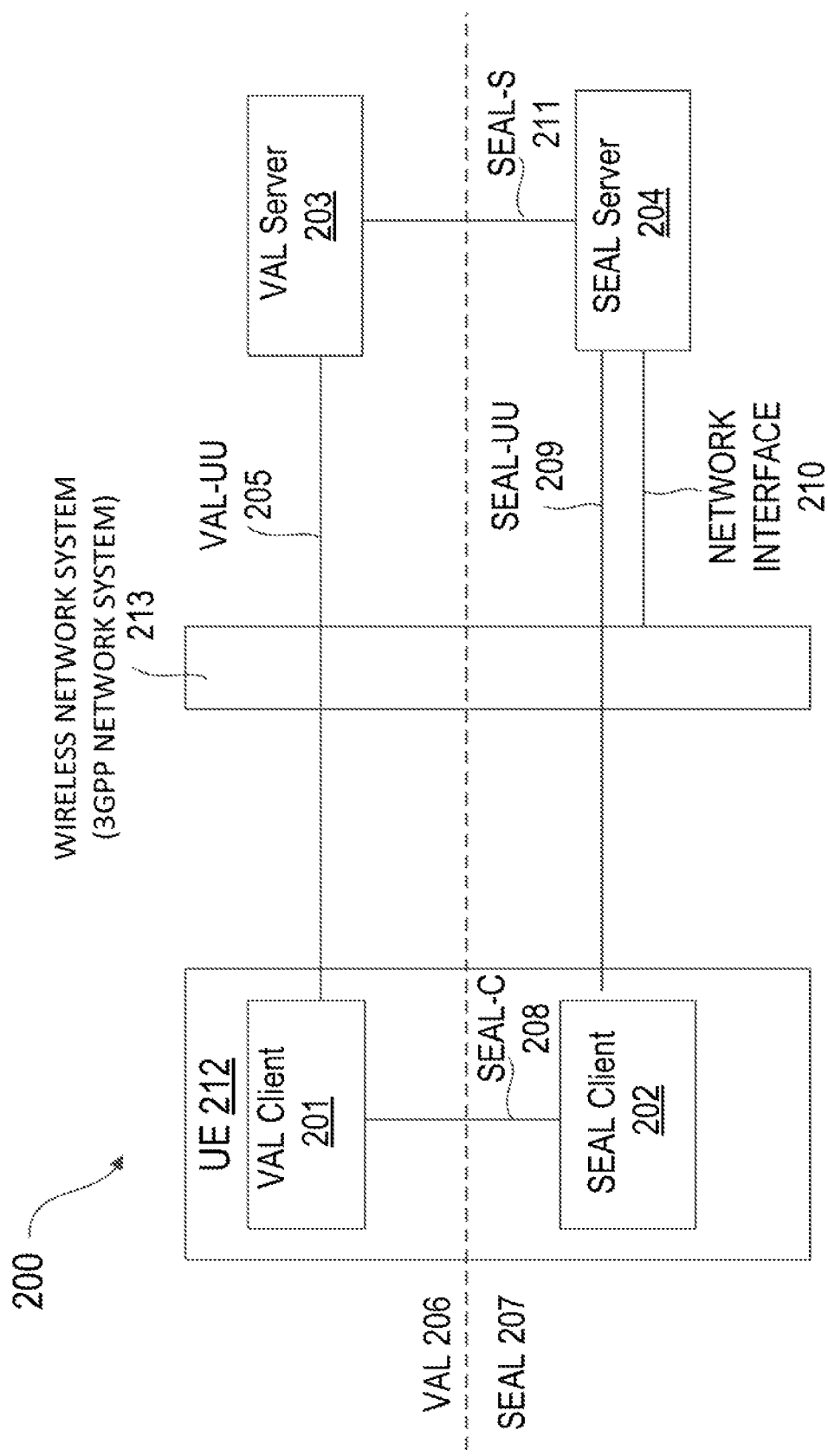
FIG. 2 is an on-network function model (200) for a service enabler architecture layer (SEAL) in accordance with an embodiment.

FIG. 2 shows an exemplary on-network functional model (200) for a service enabler architecture layer (SEAL). The model (200) can be used for network resource management and include a vertical application layer (VAL) (206) and the SEAL (207) over 3GPP wireless networks, such as a 3GPP network system (213), to support vertical applications (e.g., UAV and vehicle to everything (V2X) applications). The model (200) is illustrated as a functional architecture to include common application plane and signaling plane entities. A set of common services (e.g., group management, configuration management, location management) of the model (200) can be shared across vertical applications.

As shown in FIG. 2, the VAL (206) can include a VAL client (201), and a VAL server (203). The SEAL (207) can include a SEAL client (202) and a SEAL server (204). The VAL client (201) and the SEAL client (202) can be communicatively coupled to each other to form a User Equipment (212). The SEAL functional architecture shown in FIG. 2 can take into consideration common capabilities to support mission critical and other vertical applications.

Referring to FIG. 2, the VAL client (201) can communicate with the VAL server (203) over VAL-UU (205) reference point. VAL-UU (205) can support both unicast and multicast delivery modes.

The SEAL functional entities on the User Equipment (212) and the server can be grouped into SEAL client(s) (202) and SEAL server(s) (204), respectively. The SEAL (207) can include a common set of services (e.g., group management, location management) and reference points. The SEAL (207) can provide services to the VAL (206).

The SEAL client(s) (202) can communicate with the SEAL server(s) (204) over the SEAL-UU (209) reference points. The SEAL-UU (209) can support both unicast and multicast delivery modes. The SEAL client(s) (202) can provide the service enabler layer support functions to the VAL client(s) (201) over SEAL-C reference points (208). The VAL server(s) (203) can communicate with the SEAL server(s) (204) over the SEAL-S (211) reference points. The SEAL server(s) (204) may communicate with the underlying 3GPP network systems, such as the 3GPP network system (213), using the respective 3GPP interfaces (e.g., 210) specified by the 3GPP network system.

The specific SEAL client(s) (202) and the SEAL server(s) (204) along with their specific SEAL-UU (209) reference points and the specific network interfaces (210) of 3GPP network system (213) can be provided in the respective on-network functional model for each SEAL service.

The VAL client (201) can provide the client-side functionalities corresponding to the vertical applications (e.g., UAV, V2X client). The VAL client (201) can support interactions with the SEAL client(s) (202).

The VAL server (203) can provide the server-side functionalities corresponding to the vertical applications (e.g., UAV, V2X application servers).

The SEAL client (202) can provide the client-side functionalities corresponding to the specific SEAL service, such as a location management, a group management, a configuration management, an identity management, a key management, and a network resource management. The SEAL client(s) can support interactions with the VAL client(s) (201). The SEAL client also can support interactions with the corresponding SEAL client between the two UEs. For example, a first SEAL client (e.g., SEAL client (202)) of a first UE (e.g., UE (212)) can interact with a second SEAL client (not shown) of a second UE (not shown).

The SEAL server (204) can provide the server-side functionalities corresponding to the specific SEAL service, such as the location management, the group management, the configuration management, the identity management, the key management, and the network resource management. The SEAL server (204) can support interactions with the VAL server(s) (203).

In an exemplary 3GPP 5G wireless architecture, the SEAL (e.g., SEAL (207)) can provide procedures, information flows and Application Program Interfaces (APIs) to support vertical applications over the 3GPP system (e.g., 213) to ensure efficient use and deployment of vertical applications over 3GPP systems.

The SEAL group manager (GM) can enable group management operations for an upper application layer.

The SEAL network resource manager (NRM) server (e.g., SEAL NRM server (404)) can enable support for unicast and multicast network resource management for an upper application layer.

Three C2 (command and control) communication modes can be supported in 5G wireless technology: Direct C2, Network-Assisted C2, and UAS Traffic Management (UTM)-Navigated C2 communication.

Direct C2 can establish a direct C2 link between a UAV controller and a UAV to communicate with each other. Both the UAV controller and the UAV can be registered to a wireless network, such as a 5G network (e.g., wireless network system 213) using the radio resource configured and scheduled by the wireless network for direct C2 communication.

In Network-Assisted C2 communication, the UAV controller and UAV can register and establish a respective unicast C2 communication link to the wireless network, such as the 5G network, and communicate with each other via the network.

In UTM-Navigated C2 communication, the UAV can be provided a pre-scheduled flight plan, and UTM can maintain a C2 communication link with the UAV in order to regularly monitor the flight status of the UAV, verify the flight status with up-to-date dynamic restrictions, provide route updates, and navigate the UAV whenever necessary.

In the disclosure, an information flow and data points can be provided for Session Initiation Protocol (SIP) session management in a SEAL architecture.

The SIP can be a signaling protocol used for initiating, maintaining, and terminating real-time sessions that can include voice, video, and/or messaging applications. SIP can be used for signaling and controlling multimedia communication sessions in applications of internet telephony for voice and video calls, in private IP telephone systems, in instant messaging over Internet Protocol (IP) networks as well as mobile phone calling over LTE (VoLTE).

SIP sessions, sometimes referred to informally as "calls" and more formally referred to as dialogs, are created via invitations from one User Agent (User Agent Client or UAC) to another (User Agent Server or UAS). For example, SIP sessions can be initiated and established by a NRM client with a NRM server. This invitation transaction is basically a three-way handshake between the UAC and UAS that includes, or consists, of the initial INVITE message sent by the UAC to the UAS, one or more provisional responses sent by the UAS to the UAC, a final response sent by the UAS to the UAC, and an acknowledgment sent by the UAC to the UAS. These SIP messages can include a description of each UAC's media capabilities using the Session Description Protocol (SDP). Based on these session descriptions, a common set of parameters can be negotiated during call setup, which can then be used to send media from one UA to the other whether it be audio, video, text, etc.

In the SDP specification, a multimedia session (or SIP session) is a set of multimedia senders and receivers and the data streams flowing from senders to receivers. A session can be defined by the SDP username, session ID, network type, address type, and address elements in the origin field. A session can have multiple Real-time Transport Protocol (RTP) sessions corresponding to the User Datagram Protocol (UDP) ports define in the line of the SDP.

3GPP can enable a UAV client to request media sessions such as SIP session establishment with a NRM server. Those SIP sessions need to be managed to ensure the service continuity of media services such as video streaming, etc. Currently a UAE server does not know how many SIP sessions were established between the UAV client with the NRM server. Service interruptions may happen when more SIP session requests than the NRM server can handle occur.

By enabling the VAL server (e.g., UAE server) to have the visibility of the existing SIP sessions between the UAV client and the NRM server, the VAL server can gain visibility of existing SIP sessions and manage SIP sessions across multiple NRM servers. For example, the VAL server can manage the SIP sessions by redirecting the SIP session traffic and/or balancing the SIP connection requests.

Referring to FIG. 2, the SEAL architecture (200) provides network resource management. The network resource management (NRM) client (202) can be a functional entity of SEAL (207) to interact with the VAL client (or VAL application) (201) for management of network resources. The NRM client (202) can interact with the NRM server (204).

The NRM server (204) can be a functional entity of the SEAL (207) for management of 3GPP system network resources (e.g., unicast, multicast) to support the VAL applications (201).

The interactions related to network resource management functions between the NRM client (202) and the NRM server (204) can be supported by NRM-UU reference point (209).

The interactions related to network resource management functions between the VAL server(s) (203) and the NRM server (204) can be supported by the NRM-S reference point (211). It should be noted that the UAE server can act as the VAL server, the NRM server can act as the SEAL server (204) in FIG. 2, and the NRM client can act as the SEAL client (202) in FIG. 2.

For media session management, SDP used in an SIP package can carry important information about media parameters. SDP is a format for describing multimedia communication sessions for the purposes of announcement and invitation. A predominant use of SDP is in support of streaming media applications, such as voice over IP (VoIP)

and video conferencing. SDP does not deliver any media streams itself but is used between endpoints for negotiation of network metrics, media types, and other associated properties. The set of properties and parameters are called a session profile.

An exemplary SDP information can be provided as follows:

v=0
o=Client1 2398026505 2307593197 IN IP4 100.200.130.140
s=Client1 Audio Session
b=AS:64
b=RS:800
b=RR:2400
c=IN IP4 10.11.12.13
t=0 0
m=audio 15010 RTP/AVP 0 101
a=rtpmap: 0 PCMU/8000
a=rtpmap: 101 telephone-event/8000
a=sendrecv "v" can indicate a protocol version. "o" can indicate an owner/creator and session identifier. "s" can indicate a session name. "b" can indicate bandwidth information. "c" can indicate connection information. "t" can indicate a start time and a stop time of the session. "m" can stand for media port transport format-list. "a" can indicate zero or more session attribute lines.

SDP information, such as the SDP information above, can be sent from the VAL server (203) to the NRM server (204).

One important parameter in the SDP information is the bandwidth information. The bandwidth information can indicate a maximum bandwidth which is limited for successful media session establishment.

In the SDP information, b=as:bitrate can indicate the maximum bitrate that is allowed for a media session. For example, b=as:64 can indicate that a bandwidth of 64 kb/s is allowed.

After SIP sessions are established, the UAE server should be able to know what the existing SIP sessions are. A benefit of enabling the UAE server to have visibility of existing SIP sessions can be that the UAE server can manage SIP session across multiple NRM servers by one or a combination of redirecting SIP session traffics and load balancing SIP connection requests.

Figure 3:
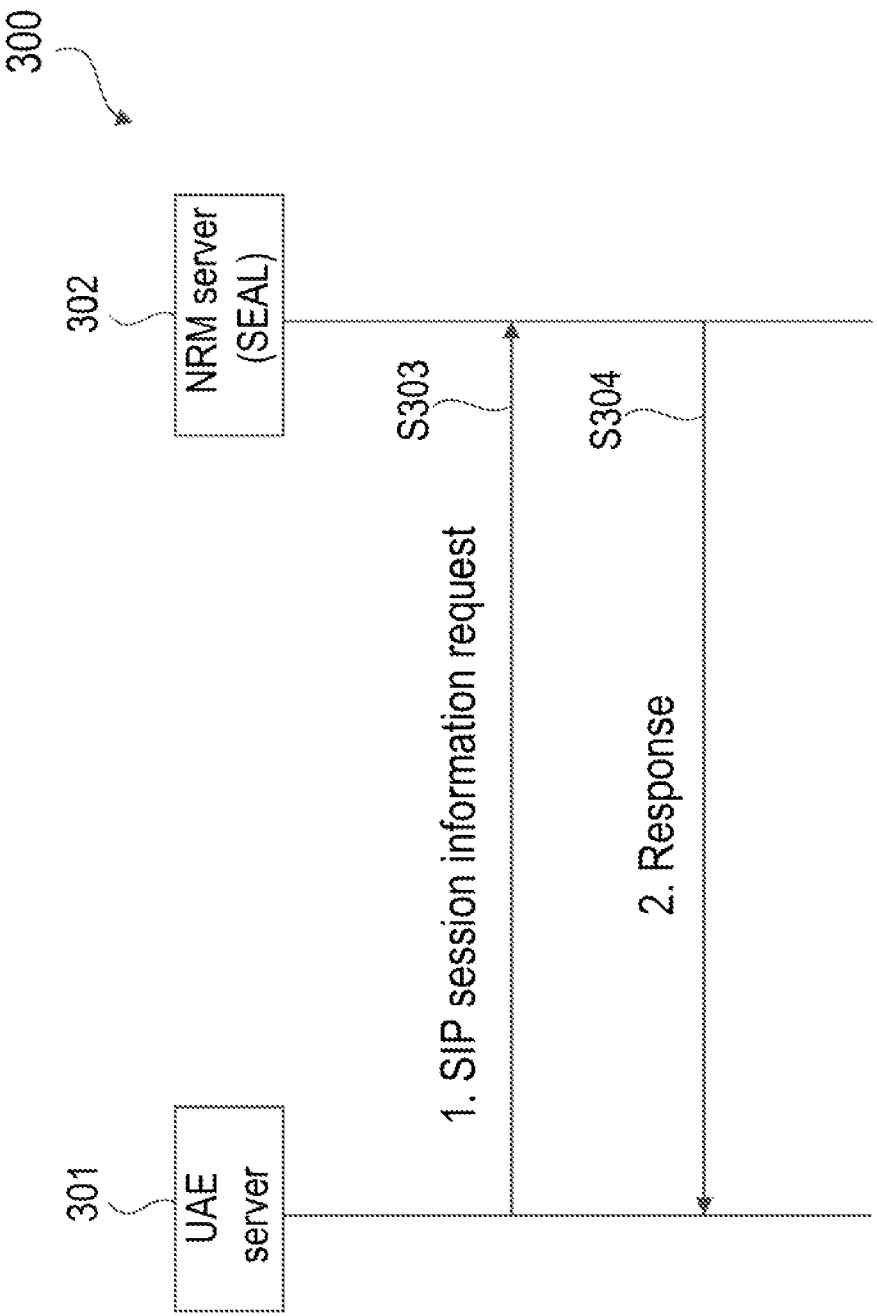
FIG. 3 shows a process (300) of session initiation protocol (SIP) session management in accordance with an embodiment.

An exemplary SIP session management (300) can be shown in FIG. 3, which can enable a VAL server (e.g., UAE server (301)) to know about existing SIP sessions that are established with a VAL client (e.g., a UAV or UAV-C) and a NRM server (302). In some embodiments, the SIP sessions can be established between an NRM-C reference point and an NRM-S reference point. The NRM-C reference point can support the interactions related to network resource management functions between the VAL client(s) and the network resource management client within a VAL UE (e.g., UE (212)). The NRM-S reference point can support the interactions related to network resource management functions between the VAL server(s) and the network resource management server. The NRM-S reference point can be an instance of a CAPIF-2 reference point.

As shown at step (S303) of FIG. 3, a UAE server (301) can send a session information request, such as SIP session information request, to a NRM server (302). The media session information request can include date points shown in Table 1 as follows.

TABLE 1

Data points for media session information request

| Information element | Status | Description |
|---|---|---|
| Requester Identity | M | The identity of VAL server performing the request |
| VAL user ID or VAL UE ID | O | The identity of VAL user or VAL UE |
| VAL Group ID | O | The identity of VAL group ID |
| SIP session information | M | The information of requesting a list of existing SIP sessions. |

It should be noted that "M" stands for "mandatory" and "O" stands for "optional" in Table 1. Thus, the VAL user ID and/or the VAL group ID may not be included in the media session information request.

As shown in Table 1, the data points can include a requester identity (ID), which can be the ID of the VAL server, such as the UAE server (301), that sends the request to the NRM server (302). The data points can include an ID for a VAL user or a VAL UE. The VAL user can be an authorized user, who can use a VAL UE to participate in one or more VAL services. An exemplary VAL user can be the user (113) in FIG. 1. The VAL UE can be a user equipment that can be used to participate in one or more VAL services. An exemplary VAL UE can be the UAV (101) in FIG. 1.

The VAL user ID is a unique identifier within the VAL service that represents the VAL user. For example, the VAL user ID may be a URI. The VAL user ID is used for authentication and authorization purposes for providing the VAL service towards the VAL user via the VAL UE. The VAL user ID also indicates the VAL service provider with whom the VAL user has a VAL service agreement. The VAL user may have VAL service agreement with several VAL service providers and thus will have obtained a unique VAL user ID per VAL service provider. The VAL user ID can be used to access any SEAL service. In some embodiments, based on the service agreement, a VAL user ID may be mapped to a VAL UE ID.

The VAL UE ID is a unique identifier within the VAL service that represents the VAL UE. For example, the VAL UE ID for V2X service can be mapped to a station ID, such as an identifier for an intelligent transport systems (ITS) station (ITS-S). The VAL UE ID is used to address the VAL UE in order to send VAL messages or to access SEAL services. In some embodiments, based on the service agreement, a generic public subscription identifier (GPSI) may be used as VAL UE identity.

Still referring to Table 1, the data points in Table 1 can include VAL Group ID, which is an ID for a VAL group. The VAL group ID is a unique identifier within the VAL service (e.g., a UAV service or a V2X service) that represents a set of VAL users or VAL UE according to the VAL service. The set of VAL users may belong to the same or different VAL service providers. The VAL group id indicates the VAL application server where the group is defined. An exemplary VAL group can be the UAV (101) and the UAV-C (102) in FIG. 1.

The date points in Table 1 can further include SIP session information. The SIP session information can be a command or request information to request a list of existing SIP sessions from the NRM server (302).

In additon, a pre-condition can be applied for process (300) of the SIP session management. For example, the pre-condition can be that the NRM client has initiated and established the SIP session with the NRM server. The VAL client can further interact with the NRM server through NRM-C reference point. Thus, the SIP sessions can be established between the VAL client (e.g., UAV) and the NRM server (e.g., NRM server (302)).

Still referring to FIG. 3, the process (300) can proceed to step (302), where the NRM server (302) can send a response message to the UAE server (301). In some embodiments, exemplary data in Table 2 can be provided in the response message.

TABLE 2

Response date for SIP session management

| Information element | Status | Description |
|---|---|---|
| Result | M | The result indicates the list of session ID(s) with the current session status. |

As shown Table 2, the response message can include a result that indicates a list of session IDs associated with a list of SIP sessions, which is/are established between the VAL client (e.g., UAV) and the NRM server (e.g., NRM server (302)). The result can also indicate current session statuses of the list of SIP sessions. It should be noted that when a VAL user, UE, or group ID is sent with the media session information request, the NRM server (302) can return a SIP session list that pertains to the corresponding VAL user, UE, or VAL group. Thus, when a plurality of VAL user IDs, or UE IDs, or VAL group IDs are sent to the NRM server (302), the NRM server (302) can return a respective list of SIP session IDs to a respective one of the VAL users, UEs, or VAL groups.

In some embodiments, the session status of the list of SIP sessions can include progress, accepted, rejected, failed, connecting, cancel, and the like. In some embodiments, the session status can include a provisional response (e.g., trying, ringing, and call is being forwarded), successful response (e.g., OK and accepted), redirection response (e.g., multiple choices and moved temporarily), client failure response (e.g., bad request, unauthorized, forbidden, not found, request timeout, temporarily unavailable, and busy here), server failure response (e.g., server time out), and global failure response (e.g., busy everywhere, decline, and not acceptable).

Figure 4:
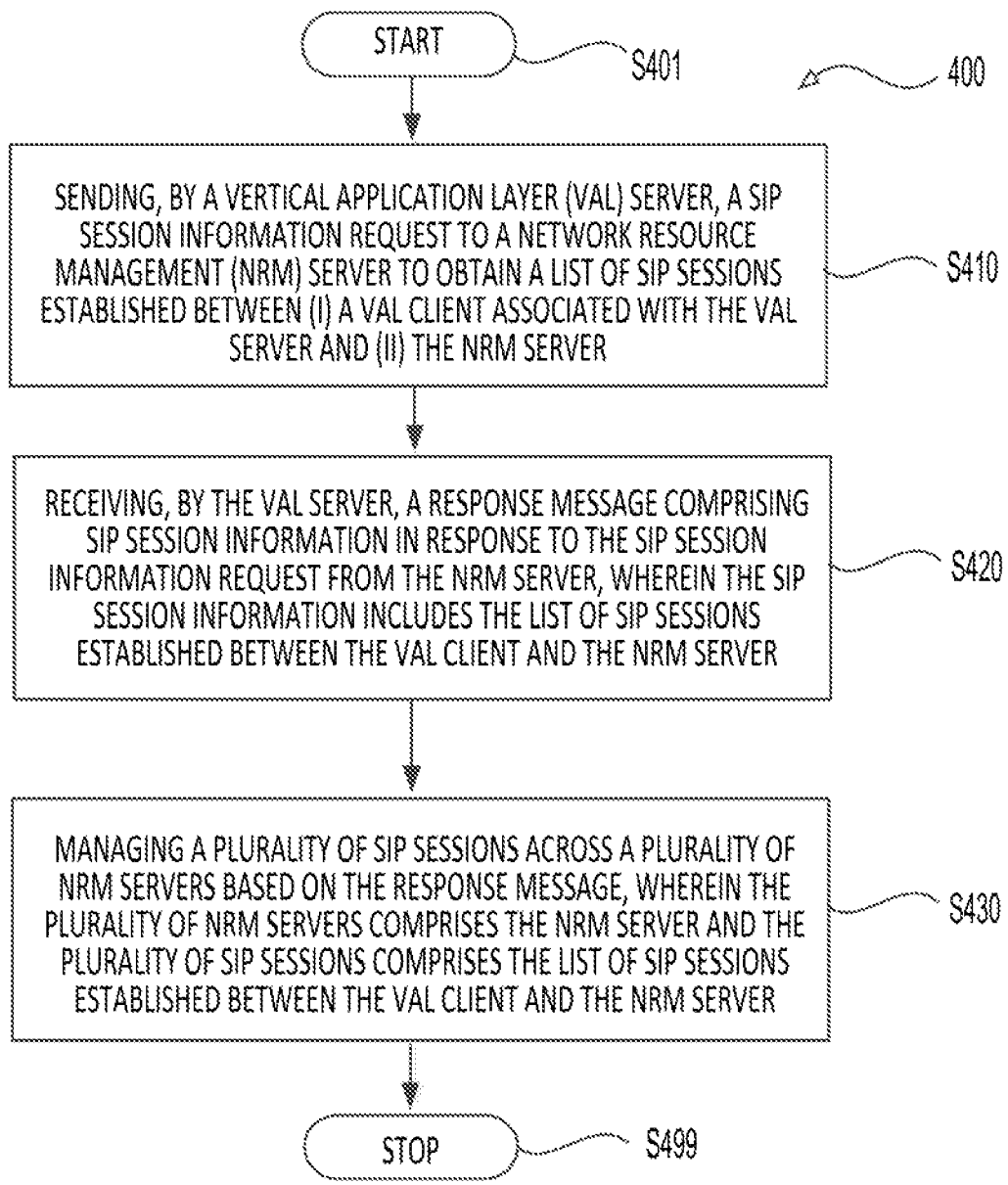
FIG. 4 shows a flow chart outlining a process of SIP session management according to some embodiments of the disclosure.

FIG. 4 shows a process (400) of SIP session management, for example in a SEAL architecture. As shown in FIG. 4, the process (400) can start from (S401) and proceed to (S410). At (S410), a SIP session information request can be sent to a network resource management (NRM) server by a vertical application layer (VAL) server to obtain a list of SIP sessions established between (i) a VAL client associated with the VAL server and (ii) the NRM server.

At (S420), a response message comprising SIP session information can be received by the VAL server from the NRM server in response to the SIP session information request. The SIP session information can include the list of SIP sessions established between the VAL client and the NRM server.

At (S430), a plurality of SIP sessions can be managed across a plurality of NRM servers based on the response message, where the plurality of NRM servers comprises the NRM server and the plurality of SIP sessions comprises the list of SIP sessions established between the VAL client and the NRM server.

In an embodiment, the SIP session information request can further include one of an identity (ID) of the VAL client and an ID of the VAL server.

In another embodiment, the SIP session information request can include an ID of a VAL group, where the VAL group can correspond to the VAL client and a VAL controller.

In some embodiments, the VAL server can include an unmanned aerial system application enabler (UAE) server, the VAL client can include an unmanned aerial vehicle (UAV), and the VAL controller can include a UAV controller.

In the process (400), the response message can indicate session IDs and session statuses associated with the SIP sessions in the list of SIP sessions, where each of the SIP sessions can be associated with a respective session ID and a respective session status.

In some embodiments, to manage the plurality of SIP sessions across the plurality of NRM servers, SIP session traffic of the plurality of SIP sessions can be redirected by the VAL server based on the response message.

In some embodiments, to manage the plurality of SIP sessions across the plurality of NRM servers, SIP connection requests can be balanced by the VAL server based on the response message.

In some embodiments, the SIP sessions in the list of SIP sessions can be initiated by a NRM client with the NRM server before the SIP session information request is sent by the UAE server.

Aspects of the Unmanned Aerial System Communication, described above, can be implemented in both a controller and a UAV as computer software using computer-readable instructions and physically stored in one or more computer-readable media, such as one or more non-transitory computer-readable storage mediums. For example, FIG. 5 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by processing circuitry such as computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
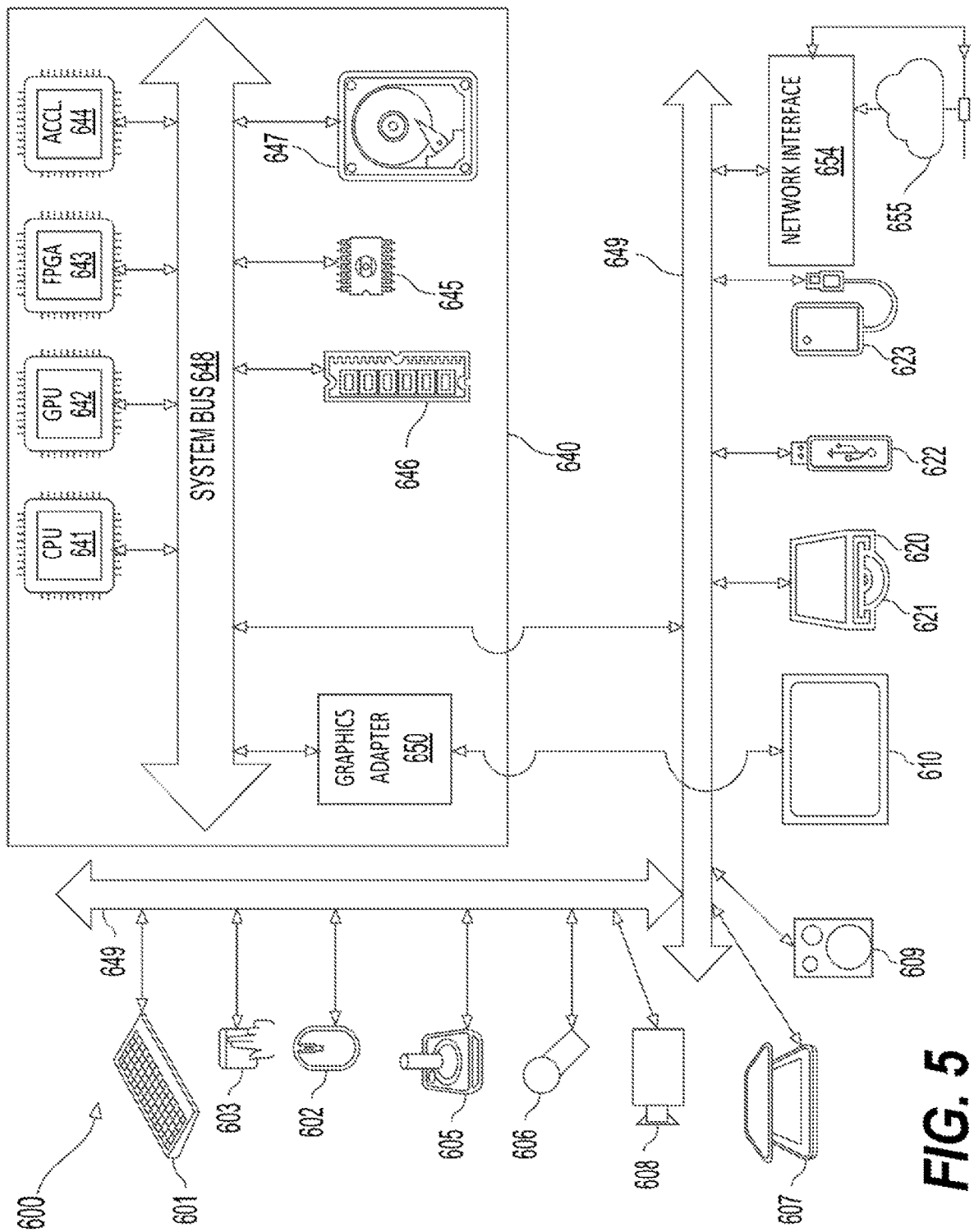
FIG. 5 is a schematic illustration of a computer system in accordance with an embodiment.

The components shown in FIG. 5 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of session initiation protocol (SIP) session management in a service enabler architecture layer (SEAL) architecture, the method comprising:
sending, by a vertical application layer (VAL) server, a SIP session information request to a network resource management (NRM) server to obtain a list of SIP sessions established between (i) a VAL client associated with the VAL server and (ii) the NRM server;
receiving, by the VAL server, a response message comprising SIP session information in response to the SIP session information request from the NRM server, wherein the SIP session information includes the list of SIP sessions established between the VAL client and the NRM server; and
managing a plurality of SIP sessions across a plurality of NRM servers based on the response message, wherein the plurality of NRM servers comprises the NRM server and the plurality of SIP sessions comprises the list of SIP sessions established between the VAL client and the NRM server.

2. The method of claim 1, wherein the SIP session information request further includes:
an identity (ID) of the VAL client, and
an ID of the VAL server.

3. The method of claim 2, wherein the SIP session information request further includes:
an identity of a VAL group, the VAL group corresponding to the VAL client, and a VAL controller.

4. The method of claim 3, wherein:
the VAL server includes an unmanned aerial system application enabler (UAE) server,
the VAL client includes an unmanned aerial vehicle (UAV), and
the VAL controller includes a UAV controller.

5. The method of claim 1, wherein the response message indicates session IDs and session statuses associated with the SIP sessions in the list of SIP sessions, each of the SIP sessions being associated with a respective session ID and a respective session status.

6. The method of claim 1, wherein the managing further comprises:
redirecting, by the VAL server, SIP session traffic of the plurality of SIP sessions based on the response message.

7. The method of claim 1, wherein the managing further comprises:
balancing, by the VAL server, SIP connection requests based on the response message.

8. The method of claim 1, wherein the SIP sessions in the list of SIP sessions are initiated by a NRM client with the NRM server prior to the sending the SIP session information request.

9. An apparatus, comprising:
processing circuitry configured to:
send a session initiation protocol (SIP) session information request to a network resource management (NRM) server to obtain a list of SIP sessions established between (i) a vertical application layer (VAL) client associated with the apparatus and (ii) the NRM server;
receive a response message comprising SIP session information in response to the SIP session information request from the NRM server, wherein the SIP session information includes the list of SIP sessions established between the VAL client and the NRM server; and
manage a plurality of SIP sessions across a plurality of NRM servers based on the response message, wherein the plurality of NRM servers comprises the NRM server and the plurality of SIP sessions comprises the list of SIP sessions established between the VAL client and the NRM server.

10. The apparatus of claim 9, wherein the SIP session information request further includes:
an identity (ID) of the VAL client, and
an ID of the apparatus.

11. The apparatus of claim 10, wherein the SIP session information request further includes:
an identity of a VAL group, the VAL group corresponding to the VAL client, and a VAL controller.

12. The apparatus of claim 11, wherein:
the VAL server includes an unmanned aerial system application enabler (UAE) server,
the VAL client includes an unmanned aerial vehicle (UAV), and
the VAL controller includes a UAV controller.

13. The apparatus of claim 9, wherein the response message indicates session IDs and session statuses associated with the SIP session in the list of SIP sessions, each of SIP sessions being associated with a respective session ID and a respective session status.

14. The apparatus of claim 9, wherein the processing circuitry is further configured to:
redirect SIP session traffic of the plurality of SIP sessions based on the response message.

15. The apparatus of claim 9, wherein the processing circuitry is further configured to:
balance SIP connection requests based on the response message.

16. The apparatus of claim 9, wherein the SIP sessions in the list of SIP sessions are initiated by a NRM client with the NRM server prior to the sending the SIP session information request.

17. A non-transitory computer readable storage medium storing instructions which when executed by at least one processor of a vertical application layer (VAL) server cause the at least one processor to perform:
sending a session initiation protocol (SIP) session information request to a network resource management (NRM) server to obtain a list of SIP sessions established between (i) a VAL client associated with the VAL server and (ii) the NRM server;
receiving a response message comprising SIP session information in response to the SIP session information request from the NRM server, wherein the SIP session information includes the list of SIP sessions established between the VAL client and the NRM server; and
managing a plurality of SIP sessions across a plurality of NRM servers based on the response message, wherein the plurality of NRM servers comprises the NRM server and the plurality of SIP sessions comprises the list of SIP sessions established between the VAL client and the NRM server.

18. The non-transitory computer readable storage medium according to claim 17, wherein the SIP session information request further includes:
an identity (ID) of the VAL client, and
an ID of the VAL server.

19. The non-transitory computer readable storage medium according to claim 18, wherein the SIP session information request further includes:
an identity of a VAL group, the VAL group corresponding to the VAL client, and a VAL controller.

20. The non-transitory computer readable storage medium according to claim 19, wherein:
the VAL server includes an unmanned aerial system application enabler (UAE) server,
the VAL client includes an unmanned aerial vehicle (UAV), and
the VAL controller includes a UAV controller.

* * * * *